(12) United States Patent
Nandha Premnath et al.

(10) Patent No.: US 10,095,305 B2
(45) Date of Patent: Oct. 9, 2018

(54) WAKE LOCK AWARE SYSTEM WIDE JOB SCHEDULING FOR ENERGY EFFICIENCY ON MOBILE DEVICES

(71) Applicant: QUALCOMM Incorporated, San Diego, CA (US)

(72) Inventors: Sriram Nandha Premnath, San Jose, CA (US); Sudha Anil Kumar Gathala, Tracy, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 15/186,444

(22) Filed: Jun. 18, 2016

(65) Prior Publication Data
US 2017/0364136 A1 Dec. 21, 2017

(51) Int. Cl.
*G06F 1/32* (2006.01)
*G06F 9/50* (2006.01)
*G06F 9/48* (2006.01)
*H04W 52/02* (2009.01)

(52) U.S. Cl.
CPC .......... *G06F 1/329* (2013.01); *G06F 9/4893* (2013.01); *G06F 9/5027* (2013.01); *H04W 52/0264* (2013.01)

(58) Field of Classification Search
CPC ...... G06F 1/329; G06F 9/5027; G06F 9/4893; H04W 52/0264
See application file for complete search history.

(56) References Cited

U.S. PATENT DOCUMENTS

| | | | | |
|---|---|---|---|---|
| 9,769,756 | B1* | 9/2017 | Cui | H04W 52/0222 |
| 9,801,135 | B1* | 10/2017 | Backholm | H04W 52/0251 |
| 9,841,802 | B2* | 12/2017 | Emami | G06F 1/3206 |
| 9,880,920 | B2* | 1/2018 | Hackborn | G06F 11/3409 |

(Continued)

FOREIGN PATENT DOCUMENTS

| | | |
|---|---|---|
| GB | 2439104 A | 12/2007 |
| WO | 2015126647 A1 | 8/2015 |

OTHER PUBLICATIONS

Guiding Tech: "GT Explains: Android Wakelocks, How to Detect and Fix Them," Retrieved dated on Feb. 22, 2016, Retrieved from the Internet URL: http://www.guidingtech.com/45384/android-wakelocks/, 13 pages.

(Continued)

*Primary Examiner* — Benjamin C Wu
(74) *Attorney, Agent, or Firm* — James T. Hagler; The Marbury Law Group

(57) ABSTRACT

Embodiments include computing devices, apparatus, and methods implemented by the apparatus for implementing wake lock aware scheduling. The apparatus may receive a wake lock request by a wake lock profiler and acquire wake lock information of a wake lock event associated with the wake lock request. The wake lock information may include a wake lock time parameter. The apparatus may send a hint having the wake lock time parameter. The apparatus may receive the hint, determine whether ready jobs can execute during the wake lock event, and send a request for permission to schedule the ready jobs for execution during the wake lock event in response to determining that the ready jobs can execute during the wake lock event.

31 Claims, 9 Drawing Sheets

(56) References Cited

U.S. PATENT DOCUMENTS

| | | | | |
|---|---|---|---|---|
| 9,965,014 | B2* | 5/2018 | Lim | G06F 1/3203 |
| 9,983,654 | B2* | 5/2018 | Kim | G06F 1/3228 |
| 2011/0040996 | A1* | 2/2011 | Hackborn | G06F 11/3409 713/340 |
| 2012/0072746 | A1* | 3/2012 | Sotomayor | G06F 1/324 713/320 |
| 2013/0268257 | A1* | 10/2013 | Hu | G06F 17/5009 703/22 |
| 2013/0316769 | A1* | 11/2013 | Kim | H04W 52/0225 455/574 |
| 2015/0095672 | A1 | 4/2015 | Haraguchi et al. | |
| 2015/0095682 | A1* | 4/2015 | Lim | G06F 1/3206 713/323 |
| 2015/0208352 | A1* | 7/2015 | Backholm | H04W 52/0251 455/574 |
| 2015/0233985 | A1* | 8/2015 | Chen | G01R 21/133 702/60 |
| 2017/0160778 | A1* | 6/2017 | Feng | G06F 1/28 |
| 2017/0245217 | A1* | 8/2017 | Kim | H04W 4/80 |

OTHER PUBLICATIONS

Lentz M., et al., "Drowsy Power Management," Proceedings of the 25th Symposium on Operating Systems Principles (SOSP), 2015, pp. 230-244.

International Search Report and Written Opinion—PCT/US2017/034497—ISA/EPO—dated Aug. 23, 2017.

Kim J., et al., "Reducing Power Consumption using Improved Wakelock on Android Platform," ICCGI 2013: The Eighth International Multi-Conference on Computing in the Global Information Technology, Jul. 21, 2013, XP055398553, pp. 171-174, URL:https://www.thinkmind.org/download.php?articleid=iccgi_2013_8_40_10261.

Kim K., et al., "WakeScope: Runtime Wakelock Anomaly Management Scheme for Android Platform," Proceedings of the International Conference on Embedded Software (EMSOFT), IEEE, Sep. 29, 2013, XP032524804, pp. 1-10, DOI: 10.1109/EMSOFT.2013.6658605.

* cited by examiner

WAKE LOCK AWARE SYSTEM WIDE JOB SCHEDULING FOR ENERGY EFFICIENCY ON MOBILE DEVICES

BACKGROUND

Different parts of a computing system of a modern smartphone schedule their individual jobs (periodic or aperiodic). Application level services and system level services are scheduled in a user space. Driver level jobs and background jobs are scheduled in a kernel space. A central processing unit (CPU) of the computing system wakes up on a regular basis to complete the scheduled jobs. Frequent CPU wake-ups increases overall energy consumption. The CPU stays awake even while a screen of the computing system is off to execute background activities of applications and services. In battery-powered systems, e.g., smartphones, this consumes battery power.

SUMMARY

The methods and apparatuses of various embodiments provide apparatuses and methods for implementing wake lock aware scheduling on a computing device. Various embodiments may include a wake lock profiler receiving a wake lock request, acquiring wake lock information of a wake lock event associated with the wake lock request, and sending a hint including a wake lock time parameter. In various embodiments the wake lock information may include the wake lock time parameter. The wake lock time parameter may include information identifying and/or enabling calculation of the duration of the wake lock, including one or more of a wake lock duration, a wake lock duration estimate, a wake lock start time and/or a wake lock end time. Some embodiments may further include receiving the hint by a scheduler, determining, by the scheduler, whether a first ready job can execute during the wake lock event, and sending, by the scheduler, a request for permission to schedule the first ready job for execution during the wake lock event in response to determining that the first ready job can execute during the wake lock event.

In some embodiments, the request for permission to schedule the first ready job for execution during the wake lock event may include an estimate of processor usage for the first ready job. Some embodiments may further include the wake lock profiler receiving the request for permission to schedule the first ready job for execution during the wake lock event, and determining whether a workload including the first ready job exceeds a total processor usage threshold. Some embodiments may further include the wake lock profiler sending a rejection of the request for permission to schedule the first ready job for execution during the wake lock event in response to determining that the workload exceeds the total processor usage threshold. Some embodiments may further include the wake lock profiler sending an approval of the request for permission to schedule the first ready job for execution during the wake lock event in response to determining that the workload does not exceed the total processor usage threshold.

Some embodiments may further include the scheduler receiving the rejection of the request for permission to schedule the first ready job for execution during the wake lock event, and determining whether a second ready job can execute during the wake lock event. Some embodiments may further include the scheduler sending a request for permission to schedule the second ready job for execution during the wake lock event in response to determining that the second ready job can execute during the wake lock event. Some embodiments may further include the scheduler receiving the approval of the request for permission to schedule the second ready job for execution during the wake lock event, and scheduling the second ready job for execution during the wake lock event.

Some embodiments may further include the scheduler determining whether the first ready job exceeds a processor usage threshold, and sending the request for permission to schedule the first ready job for execution during the wake lock event in response to determining that the first ready job can execute during the wake lock event and in response to determining that the first ready job does not exceed the processor usage threshold. Various embodiments may further include the scheduler determining whether a second ready job can execute during the wake lock event.

Some embodiments may further include the wake lock profiler determining whether the wake lock information includes a wake lock time parameter, and calculating the wake lock duration estimate for the wake lock event in response to determining that the wake lock information does not include the wake lock time parameter. Some embodiments may further include the wake lock profiler storing the wake lock duration estimate in a wake lock information data structure with a corresponding wake lock ID.

In some embodiments, calculating the wake lock duration estimate for the wake lock event may include calculating the wake lock duration estimate for the wake lock event using a plurality of wake lock durations for the wake lock event. In some embodiments, the plurality of wake lock durations may include one of a plurality of wake lock duration estimates, a plurality of wake lock duration observations, or a plurality of wake lock estimates and wake lock observations.

Various embodiments may include a wake lock aware system having a wake lock profiler communicatively connected to a scheduler. The wake lock profiler and the scheduler may be configured to perform operations of one or more of the embodiment methods summarized above.

Various embodiments may include a wake lock aware system having means for performing functions of one or more of the embodiment methods summarized above.

Various embodiments may include a non-transitory processor-readable storage medium having stored thereon processor-executable instructions configured to cause a processor of a computing device to perform operations of one or more of the embodiment methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
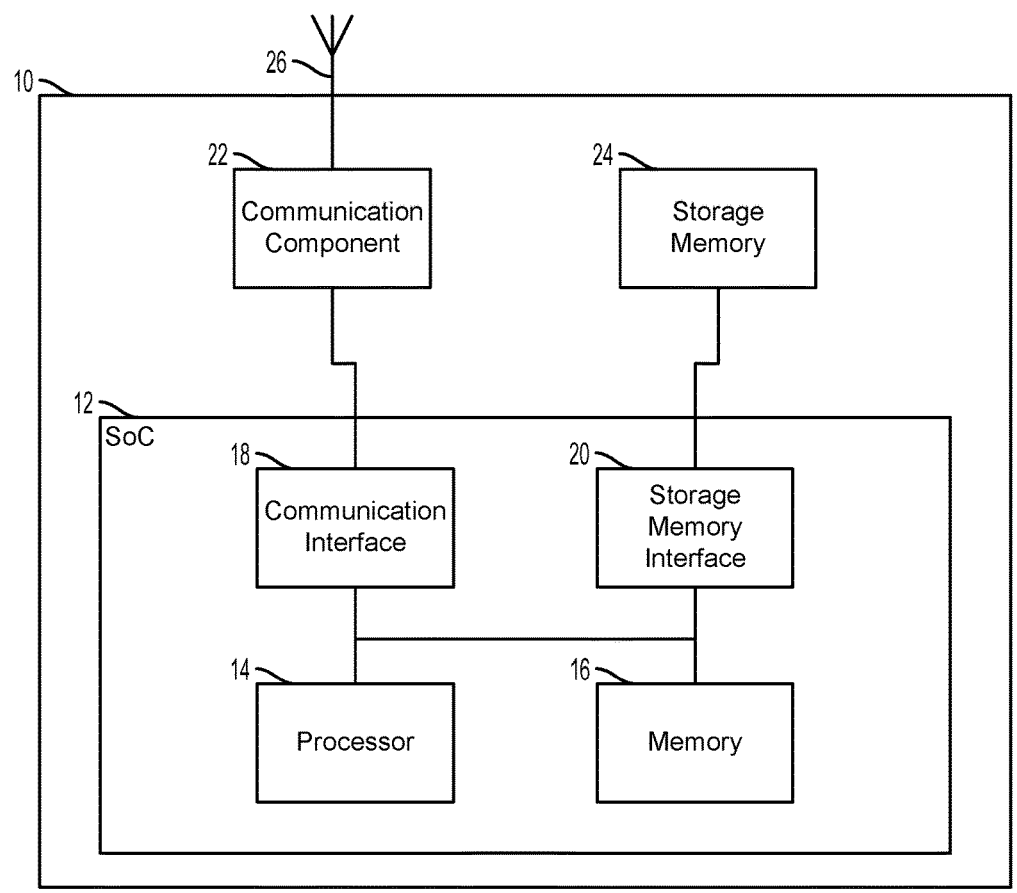
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Various embodiments include methods, and systems and devices implementing such methods for systematically adapting and performing system wide coordinated job scheduling in computing devices to enable longer/deeper processor sleep phases for better energy efficiency based on wake lock activity. The embodiments may include computing a duration estimate for a wake lock activity, providing schedulers with hints of upcoming/existing wake lock activity times, and scheduling jobs for the upcoming/existing wake lock activity so long as the workload will remain below a threshold.

User facing components (referred to as "activities" in Android systems) and background services within each application often acquire wake locks. Wake locks keep the central processing unit (CPU) awake for a certain time window to enable completing a particular task. Wake locks can be acquired with explicit time-out values. For example, a wake lock may be obtained for playing a 60 second YouTube video, or to execute some specific, well defined code section of a program. The task based nature of other wake locks makes it possible to estimate average duration of some wake locks based on history.

To reduce the number of CPU wake ups for obtaining wake-locks to execute various tasks, jobs from different parts of the system may be scheduled to opportunistically piggyback on upcoming/existing wake lock time windows. Job schedulers at different levels may be configured to adapt scheduling of jobs according to hints about upcoming/existing wake lock windows. This may enable CPUs to sleep for longer durations and reduce the number of sleep to active and active to sleep transitions.

A duration and/or duration estimate of a wake lock may be computed using a suitable measure, such as mean, median, exponential weighted moving average, etc., based on offline and/or runtime analysis. In various systems, the duration and/or duration estimate may be stored, correlated with information identifying and specifying other parameters of a wake lock. For example, the duration and/or duration estimate may be added to a global table of wake locks and correlated with a wake lock identifier (ID) in an Android system.

A wake lock profiler may be added to the system to calculate the duration and/or duration estimate, to provide schedulers at different levels with hints relating to the duration and/or duration estimate of a wake lock, to determine whether work scheduled exceeds a total processor usage threshold, and to approve/reject work schedules. The wake lock profiler may be a standalone component, an integrated component of a power manager, a software program implemented by the CPU or a combination of a software program implemented by the CPU and dedicated hardware.

An application may request a wake lock from the power manager. The request to acquire the wake lock may specify a wake lock identifier and/or a time out value indicating when to release the wake lock, resulting in the CPU being allowed to transition from active to sleep states. The wake lock profiler may detect, receive, and/or intercept the request for the wake lock and pass a wake lock hint to one or more schedulers. The wake lock hint may specify to the receiving scheduler an actual or estimated duration of an upcoming/existing process, job or task, which may include a start time and/or an end time or a duration of the process/job/task that can be used to define start and/or end times for a wake lock.

The scheduler may maintain a list of ready jobs waiting to execute either during an upcoming/existing wake lock or waiting to acquire a wake lock to execute. The scheduler may choose ready jobs that can run during the duration specified in the wake lock hint to schedule for execution during the correlated wake lock. The selection of the ready jobs may be implemented in response to determining that CPU usage will be less than a processor usage threshold during the wake lock, e.g., 50% or less usage of CPU capacity.

Each scheduler may negotiate with the wake lock profiler to schedule the schedulers' respective selected ready jobs. Each scheduler may send an estimated CPU usage for the selected ready job to the wake lock profiler. The wake lock profiler may determine whether the total CPU usage, a combination of the estimated CPU usage for the selected ready jobs from the various schedulers and the CPU usage of the scheduled jobs for the requested wake lock, will exceed a total processor usage threshold (e.g., 75% or more usage of CPU capacity). In response to determining that the total CPU usage will be less than the total processor usage threshold, the wake lock profiler may signal approval of the scheduling of the selected ready jobs to the various schedulers.

In response to determining that the total CPU usage will exceed the total processor usage threshold, the wake lock profiler may signal rejection of all of the selected ready jobs to the various schedulers. Based on the signal of rejection, the schedulers may select ready jobs having lower estimated CPU usage and continue to negotiate with the wake lock profiler until receiving approval for the selected ready jobs.

In response to determining that the total CPU usage will exceed the total processor usage threshold, the wake lock profiler may select certain ready jobs that can be executed during the wake lock without exceeding the total processor usage threshold, and signal to the various schedulers approval of some and rejection of other selected ready jobs. Based on the signal of approval, the schedulers may schedule approved ready jobs for execution during the upcoming/existing wake lock.

FIG. 1 illustrates a computing device 10 suitable for use with the various embodiments. The computing device 10 may include a system-on-chip (SoC) 12 with a processor 14, a memory 16, a communication interface 18, and a storage memory interface 20. The computing device 10 may further include a communication component 22 such as a wired or wireless modem, a storage memory 24, and an antenna 26 for establishing a wireless communication link. The processor 14 may include any of a variety of processing devices, for example, a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multi-core processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoCs 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
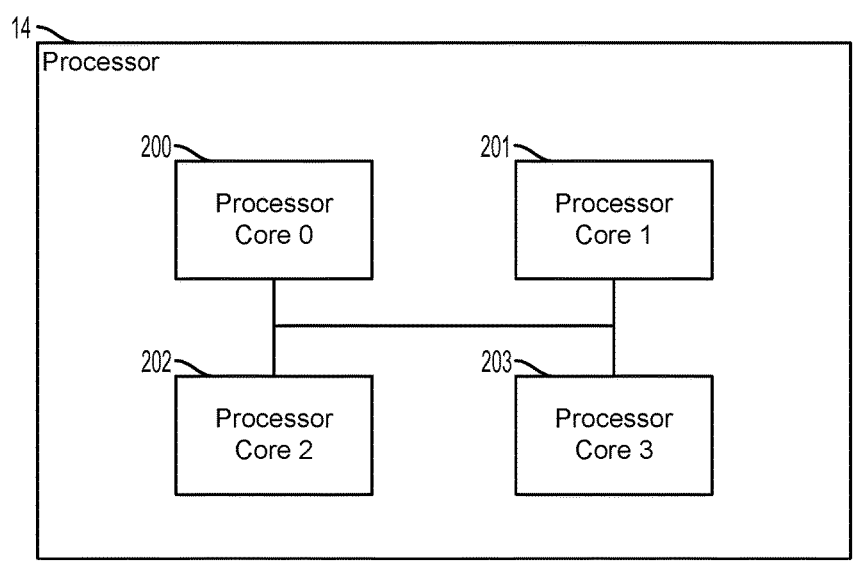
FIG. 2 is a component block diagram illustrating an example multi-core processor suitable for implementing an embodiment.

FIG. 2 illustrates a multi-core processor 14 suitable for implementing an embodiment. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the multi-core processor 14 may individually or in combination include fewer or more than the four processor cores 200, 201, 202, 203 illustrated and described herein.

Figure 3A:
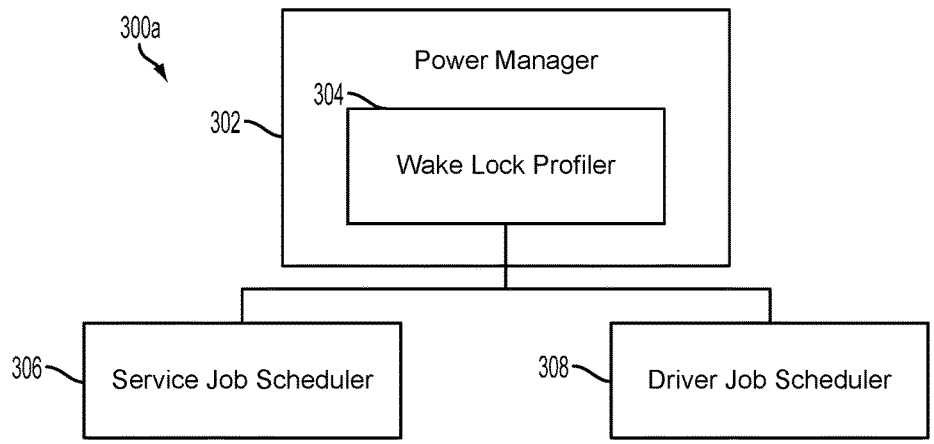
FIGS. 3A-3C are component block diagrams illustrating three examples of a wake lock aware system according to various embodiments.
Figure 3B:
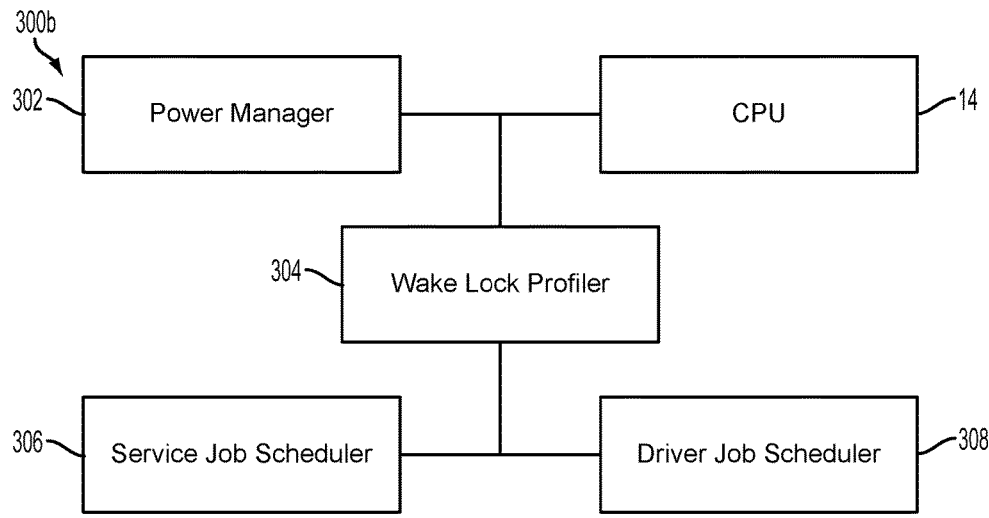
Figure 3C:
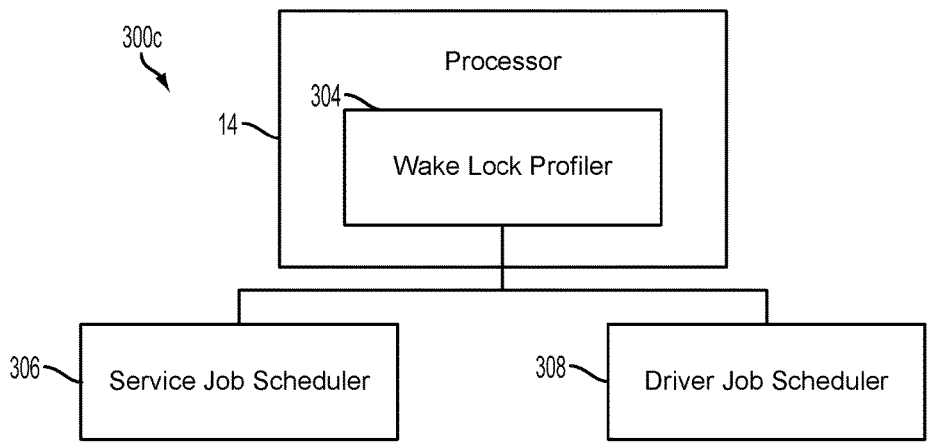

FIGS. 3A-3C illustrate example embodiments of a wake lock aware scheduling system 300a-300c. The example embodiments of the wake lock aware scheduling system 300a-300c may be included on a computing device (like computing device 10 in FIG. 1). Each of the example embodiments of the wake lock aware scheduling system 300a-300c may include a wake lock profiler 304, a service job scheduler 306, and a driver job/kernel level background job scheduler 308. The wake lock profiler 304 may be communicatively connected to the service job scheduler 306 and the driver job/kernel level background job scheduler 308. In various embodiments, the wake lock profiler 304 may be implemented as software executed on general purpose hardware (like processor 14 in FIGS. 1 and 2) or on specialized hardware, like a power manager 302. In various embodiments, the wake lock profiler 304 may be implemented as a hardware component integrated as part of general purpose hardware (like processor 14 in FIGS. 1 and 2) or as part of specialized hardware, like a power manager 302. In various embodiments, the wake lock profiler 304 may be implemented in a programmable processor executing a software component of software configured to manage wake locks, such as a power manager 302. Alternatively, the wake lock profiler 304 may be implemented in general purpose hardware/circuitry (like processor 14 in FIGS. 1 and 2) or in specialized hardware/circuitry. In various embodiments, the wake lock profiler 304 may be implemented as a specialized hardware component, and may be communicatively connected to the processor 14 and the power manager 302.

The wake lock profiler 304 may be configured to receive/detect/intercept wake lock requests from applications and use the wake lock information included with the requests and/or observations of processor 14 activity during wake lock events to compile wake lock information for various wake locks. Wake lock information that may be included with the wake lock request and compiled by the wake lock profiler 304 may include a wake lock identifier (ID), a user ID, a process ID, and a wake lock time parameter. The wake lock time parameter may include information identifying and/or enabling calculation of the duration of the wake lock, including one or more of a wake lock duration, a wake lock duration estimate, a wake lock start time and/or a wake lock end time. The wake lock identifier (ID), user ID, process ID, and wake lock time parameter may also be observed by the wake lock profiler 304 from the processor 14 during a wake lock event. The wake lock profiler 304 may also calculate and compile a wake lock duration estimate from the observations of processor 14 activity during wake lock events, and correlate the wake lock duration estimate with the compiled wake lock information from the wake lock requests. The wake lock profiler 304 may store the wake lock information in a data structure configured to correlate the wake lock information for designated wake lock identified by their wake lock IDs.

The wake lock profiler 304 may be configured to identify a wake lock request and send a hint to the service job scheduler 306 and/or the driver job/kernel level background job scheduler 308. The hint may include a hint wake lock time parameter for the requested wake lock. The wake lock time parameter may include information identifying and/or enabling calculation of the duration of the wake lock, including one or more of a wake lock duration, a wake lock duration estimate, a wake lock start time and/or a wake lock end time. The requested wake lock may be an upcoming or an existing wake lock. The service job scheduler 306 and/or the driver job/kernel level background job scheduler 308 may use the hint information to select ready jobs that may be executed during the wake lock event of the requested wake lock. The service job scheduler 306 and/or the driver job/kernel level background job scheduler 308 may request permission from the wake lock profiler 304 to schedule the selected ready jobs. The request for permission may include a processor usage indicator and/or ready job identifiers. The processor usage indicator may be an indicator of the processor usage for scheduling all of the requested ready jobs, groups of the requested ready jobs, or individual requested ready jobs.

The wake lock profiler 304 may determine whether to approve and/or reject the requests for permission to schedule the selected ready jobs. The wake lock profiler 304 may grant and/or deny the requests for permission to schedule the selected ready jobs based on whether all of the requested ready jobs, groups of the requested ready jobs, or individual requested ready jobs may be added to a total workload for the processor 14 while remaining at or below a total processor usage threshold. The wake lock profiler 304 may send an approval and/or rejection of all of the requested ready jobs, groups of the requested ready jobs, or individual requested ready jobs.

The service job scheduler 306 and/or the driver job/kernel level background job scheduler 308 may reconfigure the selections of some or all of the ready jobs in response to rejection of permission to schedule some or all of the selected ready jobs, and repeat the process of requesting permission to schedule the selected ready jobs using the reconfigured selection of ready jobs. The requesting of permission to schedule the selected ready jobs may be referred to as a negotiation. The service job scheduler 306 and/or the driver job/kernel level background job scheduler 308 may schedule some or all of the selected ready jobs in response to and in accordance with approval of permission to schedule some or all of the selected ready jobs.

Figures 4, 5:
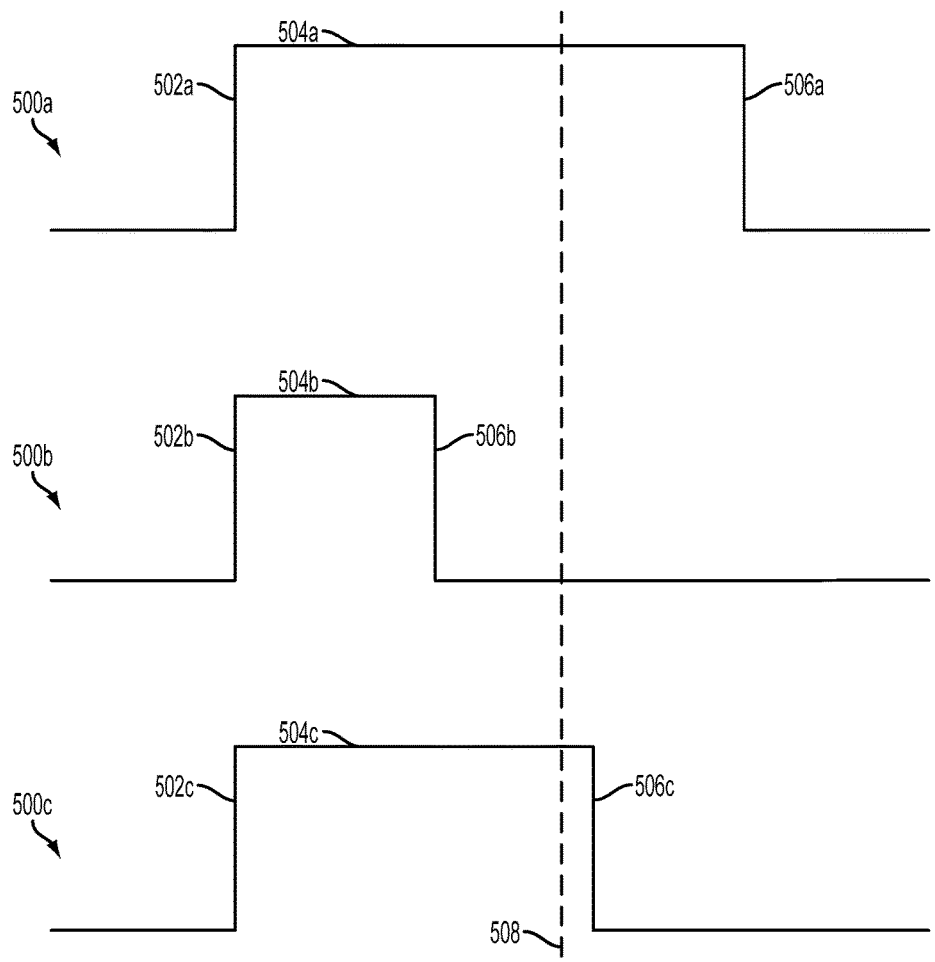
FIG. 4 is a block diagram illustrating an example of a wake lock information table according to an embodiment.
FIG. 5 is a graphical diagram illustrating an example wake lock duration estimation according to an embodiment.

FIG. 4 illustrates an example of a wake lock information table 400 according to an embodiment. As described herein, the wake lock profiler may store the wake lock information in a data structure configured to correlate the wake lock information for designated wake lock identified by their wake lock IDs. A non-limiting example of such a data structure may include the wake lock information table 400. The wake lock information table 400 may include a number of data fields represented as columns 402-410 storing designated types of wake lock information, including a wake lock ID column 402, a user ID column 404, a process ID column 406, a wake lock actual duration column 408, and a wake lock duration estimate column 410. The wake lock information table 400 may include a number of data records represented as rows 412-416 correlating the wake lock information of the columns 402-410 for a designated wake lock, designated by the wake lock ID of the wake lock ID column 402.

The wake lock information table 400 may be populated with wake lock information derived from the wake lock request and/or observations of processor activity during wake lock events. In some embodiments, the wake lock ID column 402, a user ID column 404, a process ID column 406, a wake lock actual duration column 408 for a row 412-416 may be populated using the wake lock ID, the user ID, the process ID, and the wake lock time parameter derived from the wake lock request and/or observations of processor activity during a wake lock event for the wake lock associated with the wake lock ID. In some embodiments, the wake lock actual duration column 408 may be populated with a designated wake lock duration included in the wake lock information as the wake lock time parameter. In some embodiments, the wake lock actual duration column 408 may be populated with a calculated wake lock duration derived from the wake lock time parameter including a start time and/or end time of the wake lock event and observations of processor activity during wake lock event.

The wake lock duration estimate column 410 may be populated with a calculated wake lock duration estimate of a wake lock event duration associated with the wake lock ID. In various embodiments, the wake lock duration estimate may be calculated when a wake lock time parameter is unavailable for the wake lock ID. The wake lock duration estimate may be calculated based on observations of processor activity during the wake lock event associated with the wake lock ID. In various embodiments, the wake lock duration estimate column 410 may be updated based, at least in part, on subsequent wake lock events associated with the wake lock ID. A wake lock duration estimate may be calculated for multiple wake lock events associated with the wake lock ID, and the wake lock duration estimate column 410 may be updated using a calculation of the wake lock duration estimate using the current wake lock duration observation/estimate and some or all of the previous wake lock duration observations/estimates. Various calculations may be used to calculate the wake lock duration estimate using multiple wake lock duration observations/estimates, including mean, median, exponential weighted moving average, etc. In various embodiments, the wake lock duration estimate may be based on runtime analysis. In various embodiments, the wake lock duration estimate may be based on offline analysis.

FIG. 5 illustrates an example wake lock duration estimation according to an embodiment. Various wake lock events 500a, 500b, 500c, associated with the same wake lock ID may have different timing characteristics. The timing characteristics of the various wake lock events 500a, 500b, 500c, may be used to calculate a wake lock duration estimate 508 for the wake lock ID. Each wake lock event 500a, 500b, 500c, may include a start time 502a, 502b, 502c, a duration 504a, 504b, 504c, and an end time 506a, 506b, 506c. The start time 502a, 502b, 502c, may be observed by the wake lock profiler by receiving/detecting/intercepting the wake lock request, receiving/detecting/intercepting a wake lock acquire signal indicating a grant for the wake lock, and/or observing a change in a processor state from "sleep" to "active". Similarly, the end time 506a, 506b, 506c, may be observed by the wake lock profiler receiving/detecting/intercepting a wake lock release signal indicating a revocation of the wake lock, and/or observing a change in a processor state from "active" to "sleep". The duration 504a, 504b, 504c, may be measured or calculated by the wake lock profiler by measuring or calculating a time elapsed between observing the start time 502a, 502b, 502c, and the end time 506a, 506b, 506c.

The example illustrated in FIG. 5 comparatively shows that the duration 504a for the wake lock event 500a may be the longest of the durations 504a, 504b, 504c; the duration 504b for the wake lock event 500b may be the shortest of the durations 504a, 504b, 504c; and the duration 504c for the wake lock event 500c may be between the longest wake lock duration 504a and the shortest wake lock duration 504b. The example illustrates that, although possible, the wake lock duration estimate 508 need not be equivalent to any of the durations 504a, 504b, 504c.

The example in FIG. 5 illustrates that the wake lock duration estimate 508 may be longer than the duration 504b, and shorter than the durations 504a, 504c. As discussed herein, the wake lock duration estimate 508 may be calculated using a variety of calculating means, and may use some or all of the durations 504a, 504b, 504c, the start times 502a, 502b, 502c, and/or the end times 506a, 506b, 506c. In various embodiments, the wake lock duration estimate 508 may be calculated using a previous wake lock duration estimate and some or all of the durations 504a, 504b, 504c, the start times 502a, 502b, 502c, and/or the end times 506a, 506b, 506c. The wake lock duration estimate 508 may change with additional wake lock events. The wake lock duration estimate 508 may be used to control the scheduling of ready jobs by the service job scheduler and the driver job/kernel level background job scheduler.

Figure 6:
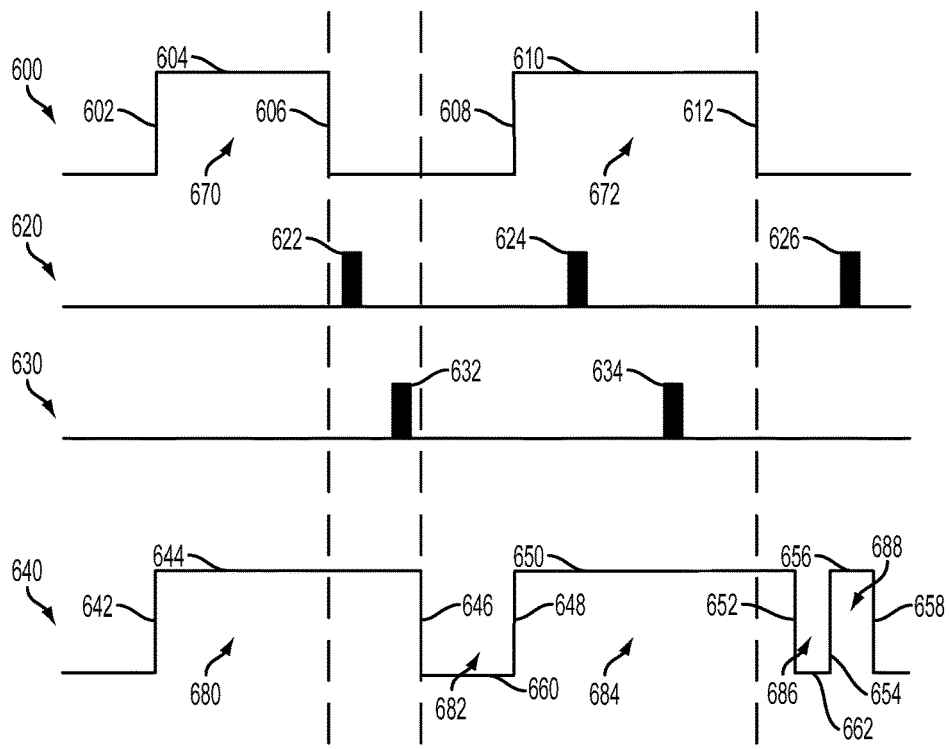
FIG. 6 is a graphical diagram illustrating an example of wake lock unaware scheduling according to an embodiment.
Figure 7:
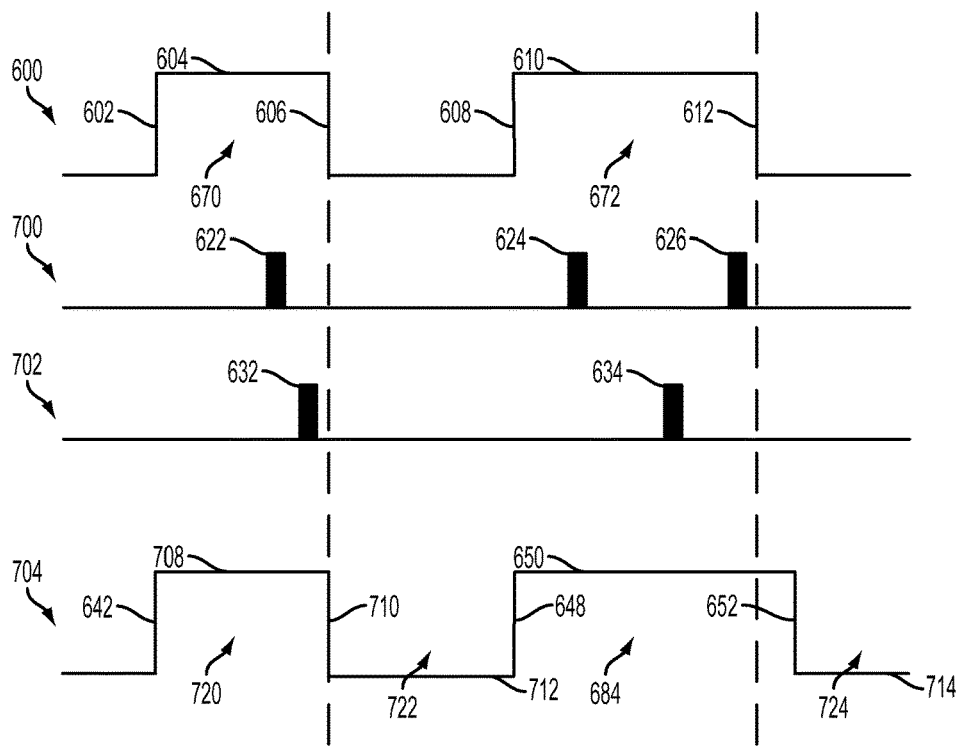
FIG. 7 is a graphical diagram illustrating an example of wake lock aware scheduling according to an embodiment.

FIGS. 6 and 7 illustrate comparative examples of wake lock unaware scheduling and wake lock aware scheduling according to an embodiment. In the examples illustrated in FIGS. 6 and 7, the same wake lock event series 600 is illustrated. In both examples, the wake lock event series 600 includes a first wake lock event 670 and a second wake lock even 672. The first wake lock event 670 may have a wake lock ID associated with a wake lock actual duration, and the second wake lock event 672 may have a wake lock ID associated with a wake lock duration estimate. The first wake lock event 670 may be illustrated by a start time 602, an actual duration 604, and an actual end time 606. The second wake lock event 672 may be illustrated by a start time 608, an estimated duration 610, and an estimated end time 612.

The example illustrated in FIG. 6 may further include a wake lock unaware service jobs schedule 620, a wake lock unaware driver jobs/kernel level background jobs schedule 630, and a processor state series 640. The wake lock unaware service jobs schedule 620 and the wake lock unaware driver jobs/kernel level background jobs schedule 630 may include jobs 622, 624, 626, 632, 634 that may be scheduled without regard to the duration of the wake lock events 670, 672. In this example the jobs 622, 626, and 632 may be scheduled outside of the wake lock events 670, 672.

The processor state series 640 may include various processor states 680-688. The processor states 680-688 may include "active" states 680, 684, 688, and "sleep" states 682, 686. Each processor state 680-688 may be illustrated by a transition edge 642, 646, 648, 652, 654, 658, and a state duration 644, 650, 656, 660, 662. The active states 680, 684, 688 may be triggered by the wake lock events 670, 672 and/or the scheduled jobs 622-634. The example in FIG. 6 illustrates that the actual end time 606 for the wake lock event 670 and the transition edge 646 from active state 680 to sleep state 682 may not coincide; the estimated end time 612 for the wake lock event 672 and the transition edge 652 from active state 684 to sleep state 686 may not coincide; and there may not be a wake lock event that coincides with the active state 688.

The example illustrated in FIG. 7 may further include a wake lock aware service jobs schedule 700, a wake lock aware driver jobs/kernel level background jobs schedule 702, and a processor state series 704. The wake lock aware service jobs schedule 700 and the wake lock aware driver jobs/kernel level background jobs schedule 702 may include the same jobs 622, 624, 626, 632, 634, as the example in illustrated in FIG. 6. However, because of the wake lock aware scheduling, the jobs 622, 624, 626, 632, 634 may be scheduled to align with the duration of the wake lock events 670, 672 in the example illustrated in FIG. 7. In this example the jobs 622, 624, 626, 632, 634, may be scheduled within the wake lock events 670, 672.

The processor state series 704 may include various processor states 684, 720-724. The processor states 684, 720-724 may include "active" states 684, 720 and "sleep" states 722, 724. Each processor state 684, 720-724 may be illustrated by a transition edge 642, 648, 652, 710 and a state duration 650, 708, 712, 714. The active states 684, 720 may be triggered by the wake lock events 670, 672 and/or the scheduled jobs 622-634. The example in FIG. 7 illustrates that the actual end time 606 for the wake lock event 670 and the transition edge 710 from active state 720 to sleep state 722 may coincide; the estimated end time 612 for the wake lock event 672 and the transition edge 652 from active state 684 to sleep state 724 may not coincide; and there may not be an active state not coinciding with a wake lock event.

A comparison of the examples illustrated in FIGS. 6 and 7 shows that when using wake lock aware scheduling versus wake lock unaware scheduling, the active state durations 650, 708 may be cumulatively less than the active state durations 644, 650, 656. Consequently, the sleep state durations 722, 724 may be cumulatively more than the sleep state durations 682, 686. The number of transition edges from sleep state to active state 642, 648, may be cumulatively less than the number of transition edges from sleep state to active state 642, 648, 654. Therefore, wake lock aware scheduling may provide power benefits over wake lock unaware scheduling for the same jobs 622, 624, 626, 632, 634, by reducing the time the processor spends in an active state, increasing the time the processor spends in a sleep state, and decreasing the number of transitions the processor makes from a sleep state to an active state. The power benefits may be realized even when the estimated end time 612 for the wake lock event 672 and the transition edge 652 from active state 684 to sleep state 724 do not coincide, because the job 626 may be executed during the wake lock event 672, obviating the need for the active state 688.

Figure 8:
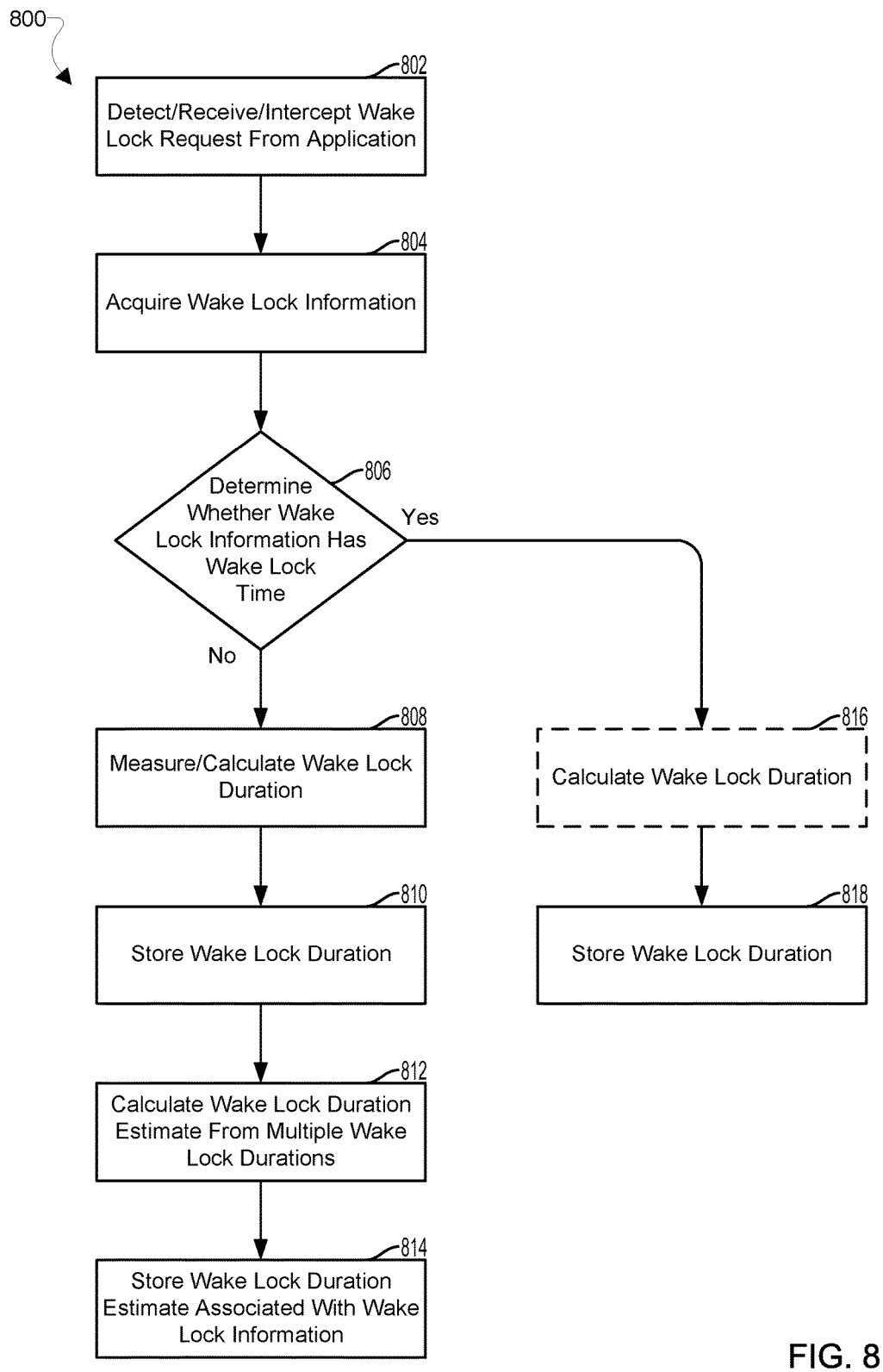
FIG. 8 is a process flow diagram illustrating a method for wake lock duration estimation according to an embodiment.

FIG. 8 illustrates a method 800 for wake lock duration estimation according to an embodiment. The method 800 may be implemented in a computing device in software (e.g., the power manager 302 and the wake lock profiler 304 in FIGS. 3A-3C) executing in a processor (e.g., the processor 14 in FIGS. 1, 2, and 3C), in general purpose hardware, in dedicated hardware (e.g., the power manager 302 and the wake lock profiler 304 in FIGS. 3A-3C), or in a combination of a processor and dedicated hardware, such as a processor executing software within a wake lock aware scheduling system that includes other individual components. In order to encompass the alternative configurations enabled in the various embodiments, the hardware implementing the method 800 is referred to herein as a "processing device."

In block 802, the processing device may detect/receive/intercept a wake lock request from an application. The processing device may be configured to monitor or may be located in a communication path for wake lock requests.

In block 804, the processing device may acquire wake lock information for the wake lock associated with the wake lock request. The wake lock information may include wake lock ID, user ID, process ID, and/or actual duration. The processing device may acquire the wake lock information by retrieving it from wake lock information sent with the wake lock request, from a memory device, such as cache registers and buffers, used for implementing a wake lock for a processor. Having retrieved at least a wake lock ID, the processing device may retrieve other wake lock information associated with the wake lock ID from the wake lock information data structure (e.g., wake lock information table 400 in FIG. 4).

In determination block 806, the processing device may determine whether the wake lock information includes a wake lock time parameter. Thus, in block 806, the processing device may determine whether the wake lock information includes information identifying and/or enabling calculation of the duration of the wake lock, such as a wake lock actual duration or both a wake lock start time and a wake lock end time.

In response to determining that the wake lock information does not include a wake lock time parameter (i.e., determination block 806="No"), the processing device may measure or calculate a wake lock duration in block 808. The processing device may measure or calculate the wake lock duration from observations of the wake lock request, including grant and release of wake lock signaling and/or processor activity corresponding to the wake lock request, and/or from a single wake lock time parameter including one or the other of the wake lock start time and the wake lock end time. The processing device may begin and end measuring the duration of a wake lock based on the grant and release of wake lock signaling, transitions of a processor between active and sleeps states corresponding to the wake lock request, and/or the wake lock start time or the wake lock end time. The processing device may calculate the duration of a wake lock based on times for the grant and release of wake lock signaling, transitions of a processor between active and sleeps states corresponding to the wake lock request, and/or the wake lock start time or the wake lock end time.

In block 810, the processing device may store the wake lock duration that it measured or calculated. The processing device may store the wake lock duration in a general or dedicated volatile or nonvolatile memory (e.g., the memory 16, 24, in FIG. 1) for later retrieval, such as for estimating the wake lock duration based on multiple wake lock durations.

In block 812, the processing device may calculate a wake lock duration estimate using multiple of the stored wake lock durations. In various embodiments, the multiple stored wake lock durations may be embodied by a previous wake lock duration estimate, and the calculation of the wake lock duration estimate may include using the previous wake lock duration estimate and one or more recent stored wake lock durations. In various embodiments, calculating a wake lock duration estimate may include using various techniques for calculating, such as calculating a mean, median, exponential weighted moving average, etc.

In block 814, the processing device may store the wake lock duration estimate in a wake lock information data structure with a corresponding wake lock ID (i.e., an ID of the corresponding wake lock event). The wake lock duration estimate may be stored in the wake lock information data structure. For example, the processing device may store the wake lock duration estimate in memory in a manner that associates the estimate with wake lock information that includes the associated wake lock ID, as well as a user ID, and/or a process ID. In some embodiments, the operations in blocks 802-814 may be executed for offline and/or runtime analysis to develop a wake lock duration estimate for an associated wake lock ID.

In response to determining that the wake lock information does include a wake lock time parameter (i.e., determination block 806="Yes"), the processing device may optionally calculate a wake lock duration from the wake lock time parameter, such as the wake lock start time and the wake lock end time, in optional block 816. Without the wake lock actual duration available to the processing device, the device may use the wake lock start time and the wake lock end time to determine the wake lock actual duration.

In block 818, the processing device may store the wake lock actual duration. In various embodiments, the processing device may store the wake lock actual duration in a memory (e.g., memory 16, 24, in FIG. 1) for use during the wake lock event associated with the wake lock request. The wake lock actual duration may be stored in the wake lock information data structure with the corresponding wake lock ID. For example, the processing device may store the wake lock actual duration in a manner that associates the duration with corresponding wake lock information, including an associated wake lock ID, user ID, and/or process ID.

Figure 9:
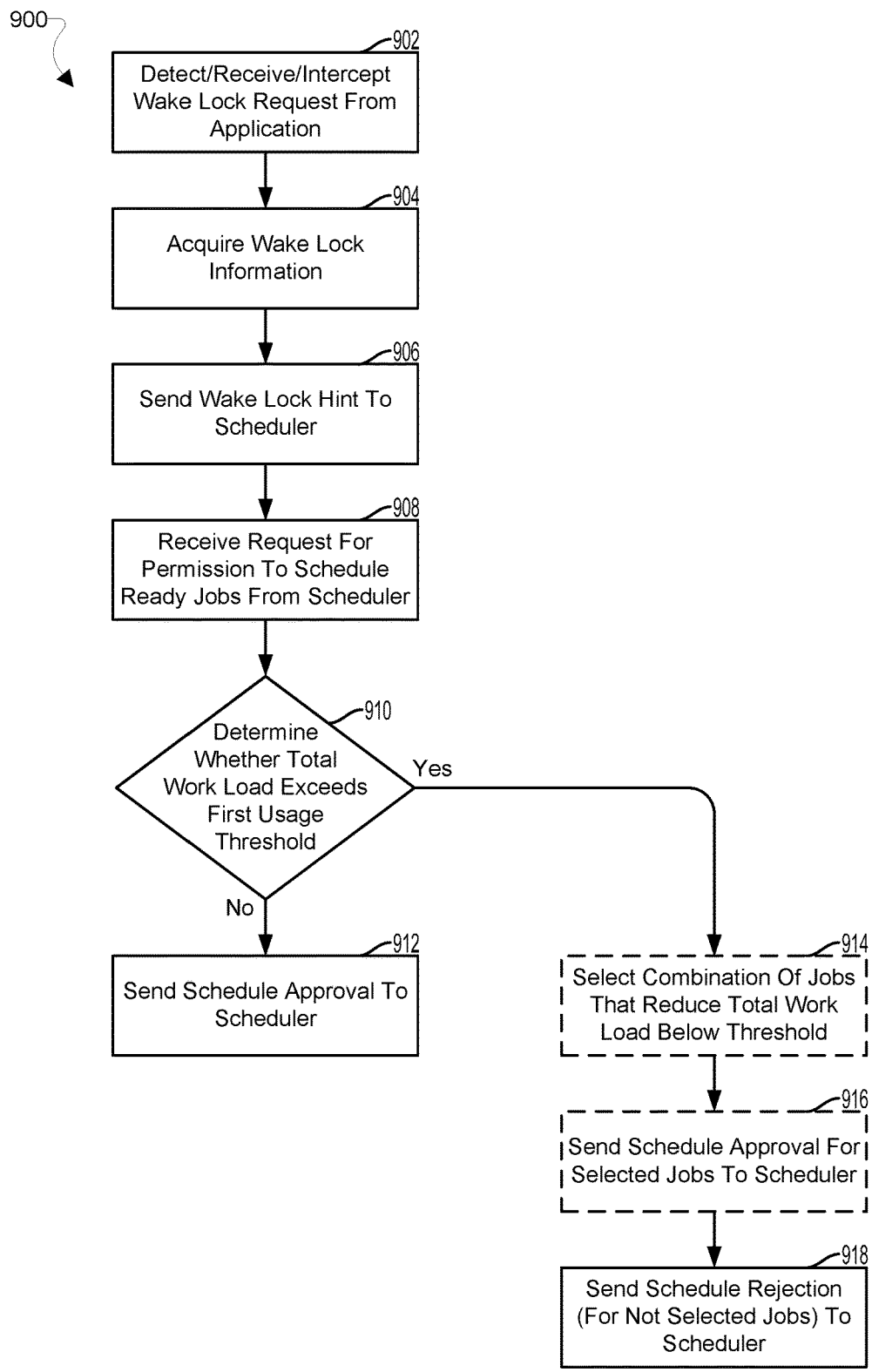
FIG. 9 is a process flow diagram illustrating a method for wake lock aware scheduling according to an embodiment.

FIG. 9 illustrates a method 900 for wake lock aware scheduling according to an embodiment. The method 900 may be implemented in a computing device in software (e.g., the power manager 302 and the wake lock profiler 304 in FIGS. 3A-3C) executing in a processor (e.g., the processor 14 in FIGS. 1, 2, and 3C), in general purpose hardware, in dedicated hardware (e.g., the power manager 302 and the wake lock profiler 304 in FIGS. 3A-3C), or in a combination of a processor and dedicated hardware, such as a processor executing software within a wake lock aware scheduling system that includes other individual components. In order to encompass the alternative configurations enabled in the various embodiments, the hardware implementing the method 900 is referred to herein as a "processing device."

In block 902, the processing device may detect/receive/intercept a wake lock request from an application. The processing device may be configured to monitor or may be located in a communication path for wake lock requests.

In block 904, the processing device may acquire wake lock information for the wake lock associated with the wake lock request. The wake lock information may include a wake lock ID, a user ID, a process ID, and/or a wake lock time parameter (e.g., one or more of a wake lock duration, a wake lock duration estimate, a wake lock start time and/or a wake lock end time). The processing device may acquire the wake lock information by retrieving it from wake lock information sent with the wake lock request, from a memory device, such as cache registers and buffers, used for implementing a wake lock for a processor. Having retrieved at least a wake lock ID, the processing device may retrieve other wake lock information associated with the wake lock ID from the wake lock information data structure (e.g., wake lock information table 400 in FIG. 4), including wake lock duration estimate.

In block 906, the processing device may send a hint to one or more schedulers (e.g., service job scheduler 306, the driver job/kernel level background job scheduler 308 in FIGS. 3A-3C). The hint may include a hint wake lock time parameter, which may include a wake lock time parameter and/or a wake lock duration estimate for the requested wake lock. The requested wake lock may be an upcoming or an existing wake lock.

In block 908, the processing device may receive a request for permission to schedule ready jobs from a scheduler. Ready jobs may include jobs that are waiting to be executed during a wake lock event. Upon receiving the hint, the scheduler may select ready jobs for execution and send the request for permission to schedule the selected ready jobs as described further with reference to the method 1000 illustrated in FIG. 10. The request for permission to schedule ready jobs may include an estimate for processor usage of each, groups, and/or all of the selected ready jobs, and/or an identifier for each, groups, and/or all of the selected ready jobs.

In determination block 910, the processing device may determine whether a total workload, including the selected ready jobs, exceeds a total processor usage threshold.

In response to determining that the total workload does not exceed the total processor usage threshold (i.e., determination block 910="No"), the processing device may send approval of the request for permission to schedule the selected ready jobs to the scheduler in block 912.

In response to determining that the total workload does exceed the total processor usage threshold (i.e., determination block 910="Yes"), the processing device may select a combination of the ready jobs that reduce the total workload below the total processor usage threshold in optional block 914. The processing device may use the information of the request for permission to schedule the selected ready jobs to select the combination of the ready jobs.

In optional block 916, the processing device may send the approval of permission to schedule the combination of the ready jobs selected by the processing device to the scheduler.

In block 918, the processing device may send a rejection of the request for permission to schedule the ready jobs to the scheduler. In various embodiments, the rejection of the request for permission to schedule the ready jobs may include the all of the ready jobs selected by the scheduler, or only the ready jobs not selected by the processing device for the combination of the ready jobs.

Figure 10:
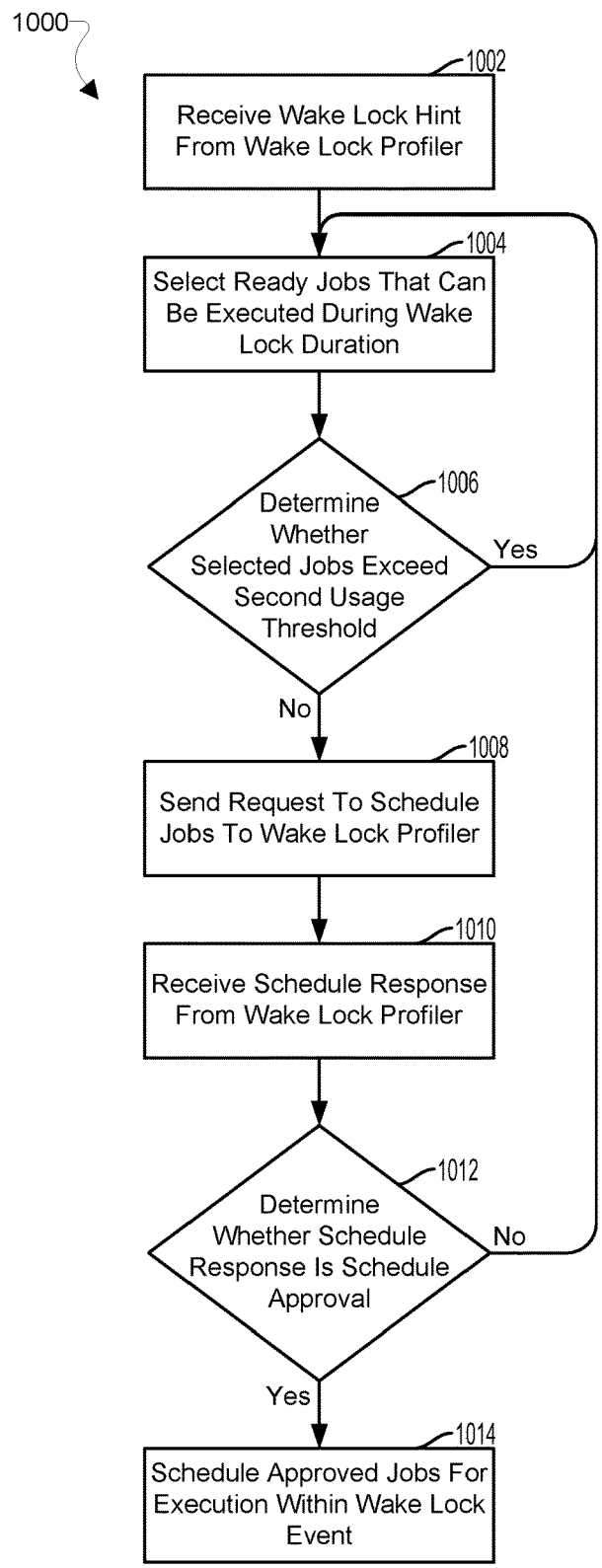
FIG. 10 is a process flow diagram illustrating a method for wake lock aware scheduling according to an embodiment.

FIG. 10 illustrates a method 1000 for wake lock aware scheduling according to an embodiment. The method 1000 may be implemented in a computing device in software (e.g., the service job scheduler 306 and the driver job/kernel level background job scheduler 308 in FIGS. 3A-3C) executing in a processor (e.g., the processor 14 in FIGS. 1, 2, and 3C), in general purpose hardware, in dedicated hardware (e.g., the service job scheduler 306 and the driver job/kernel level background job scheduler 308 in FIGS. 3A-3C), or in a combination of a processor and dedicated hardware, such as a processor executing software within a wake lock aware scheduling system that includes other individual components. In order to encompass the alternative configurations enabled in the various embodiments, the hardware implementing the method 1000 is referred to herein as a "processing device."

In block 1002, the processing device may receive a hint from the wake lock profiler. The hint may include a hint wake lock time parameter, which may include a wake lock time parameter and/or a wake lock duration estimate for the requested wake lock. The requested wake lock may be an upcoming or an existing wake lock.

In block 1004, the processing device may select ready jobs that may be executed during the wake lock event associated with the requested wake lock. The processing device may compare estimated durations for execution of the ready jobs to the hint wake lock time parameter received with the hint to determine whether the ready jobs may complete execution during the duration of the wake lock event associated with the wake lock request. The processing device may select the ready jobs that may complete execution during the duration of the wake lock event associated with the wake lock request.

In determination block 1006, the processing device may determine whether the selected ready jobs together exceed a processor usage threshold. The processing device may compare estimated processor usage for execution of the ready jobs to the processor usage threshold to determine whether the ready jobs cumulatively exceed the processor usage threshold.

In response to determining that the selected ready jobs together exceed the processor usage threshold (i.e., determination block 1006="Yes"), the processing device may select ready jobs that may be executed during the wake lock event associated with the requested wake lock in block 1004. Via repeated executions of the operations in block 1004, the processing device may track the estimated processor usage total for the selected ready jobs and select ready jobs that may be executed during the wake lock event associated with the requested wake lock that also reduce the estimated processor usage total from the previous selected ready jobs. Latter selections of ready jobs may include ready jobs previously selected for execution during the wake lock event associated with the requested wake lock.

In response to determining that the selected ready jobs together do not exceed the processor usage threshold (i.e., determination block 1006="No"), the processing device may send a request for permission to schedule the selected ready jobs to the wake lock profiler in block 1008. As described above with reference to the method 900 illustrated in FIG. 9, the wake lock profiler may determine whether to respond to the request for permission to schedule the selected ready jobs with full or partial approval and/or rejection of the request for permission to schedule the selected ready jobs.

In block 1010, the processing device may receive a response to the request for permission to schedule the selected ready jobs from the wake lock profiler. The response may include identification of individual ones, groups, or all of the selected ready jobs for which permission to schedule is approved and/or rejected.

In determination block 1012, the processing device may determine whether the response to the request for permission to schedule the selected ready jobs includes approval and/or rejection of the request for permission to schedule the selected ready jobs. In various embodiments, the processing device may determine that the response includes approval, rejection, or approval and rejection of the request for permission to schedule the selected ready jobs.

In response to determining that the response to the request for permission to schedule the selected ready jobs includes approval of the request for permission to schedule the selected ready jobs (i.e., determination block 1012="Yes"), the processing device may schedule the approved ready tasks for execution during the wake lock event associated with the wake lock request in block 1014.

In response to determining that the response to the request for permission to schedule the selected ready jobs includes rejection of the request for permission to schedule the selected ready jobs (i.e., determination block 1012="No"), the processing device may select a different set of ready jobs that may be executed during the wake lock event associated with the requested wake lock in block 1004.

In response to determining that the response to the request for permission to schedule the selected ready jobs includes approval and rejection of the request for permission to schedule the selected ready jobs (i.e., determination block 1012="Yes" and "No"), the processing device may schedule the approved ready tasks for execution during the wake lock event associated with the wake lock request in block 1014, and may select a different set of ready jobs that may be executed during the wake lock event associated with the requested wake lock in block 1004.

In various embodiments, the method 800 illustrated in FIG. 8, the method 900 illustrated in FIG. 9, and the method 1000 illustrated in FIG. 10 may be executed concurrently in a cooperative manner.

Figure 11:
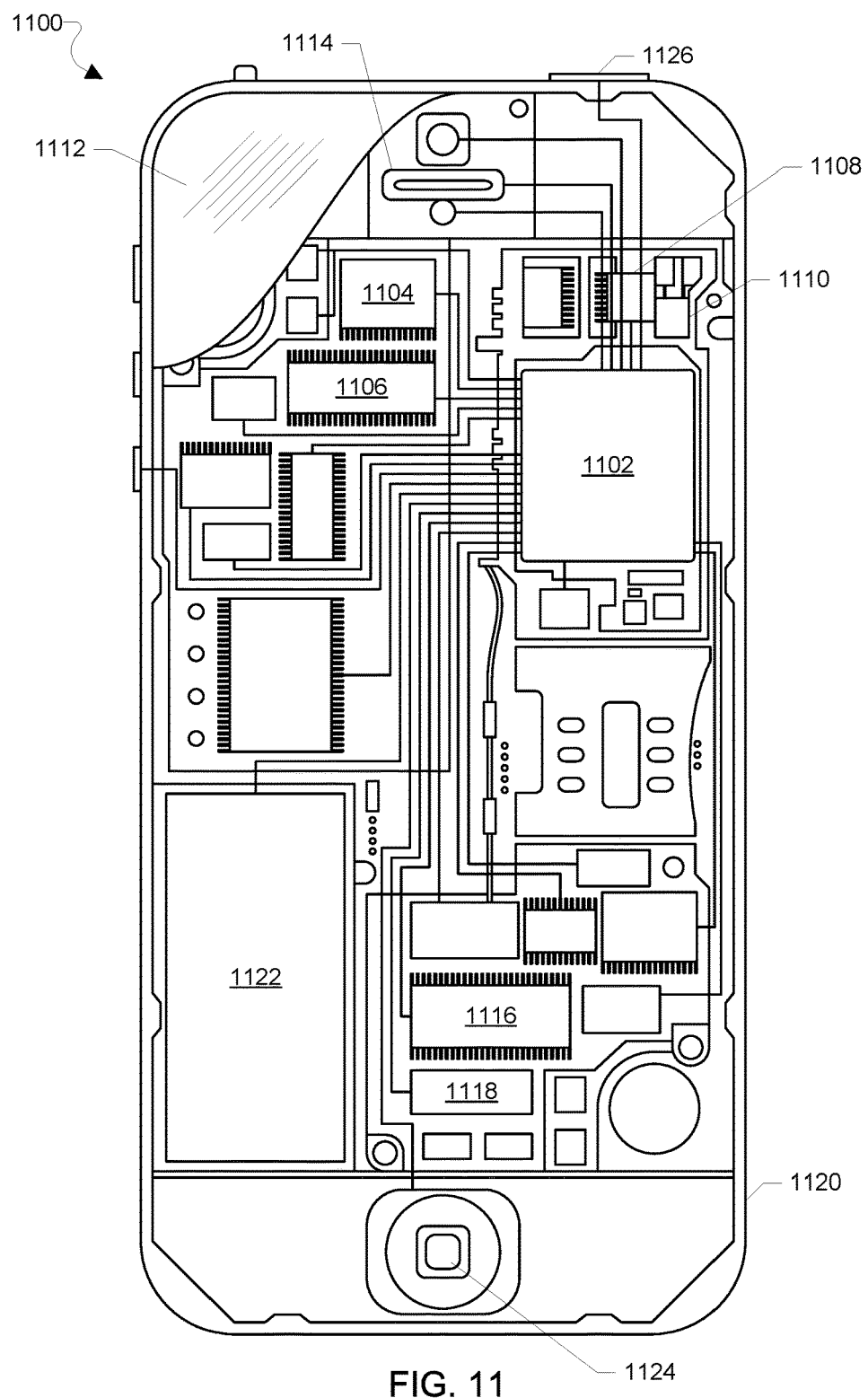
FIG. 11 is component block diagram illustrating an example mobile computing device suitable for use with the various embodiments.

The various embodiments (including, but not limited to, embodiments described above with reference to FIGS. 1-10) may be implemented in a wide variety of computing systems including mobile computing devices, an example of which suitable for use with the various embodiments is illustrated in FIG. 11. The mobile computing device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the computing device 1100 need not have touch screen capability.

The mobile computing device 1100 may have one or more radio signal transceivers 1108 (e.g., Peanut, Bluetooth, Zigbee, Wi-Fi, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile computing device 1100 may include a cellular network wireless modem chip 1116 that enables communication via a cellular network and is coupled to the processor.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as Universal Serial Bus (USB), FireWire, Thunderbolt, or PCIe. The peripheral device connection interface 1118 may also be coupled to a similarly configured peripheral device connection port (not shown).

The mobile computing device 1100 may also include speakers 1114 for providing audio outputs. The mobile computing device 1100 may also include a housing 1120, constructed of a plastic, metal, or a combination of materials, for containing all or some of the components described herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off.

Figure 12:
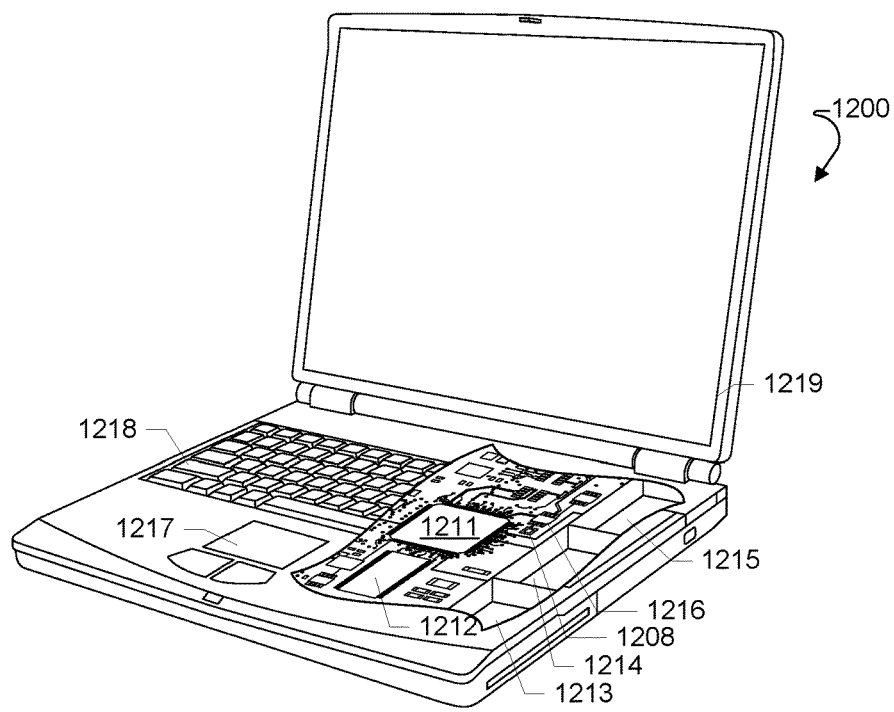
FIG. 12 is component block diagram illustrating an example mobile computing device suitable for use with the various embodiments.

The various embodiments (including, but not limited to, embodiments described above with reference to FIGS. 1-10) may be implemented in a wide variety of computing systems include a laptop computer 1200 an example of which is illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1211. The computer 1200 may also include a floppy disc drive 1214 and a compact disc (CD) drive 1215 coupled to the processor 1211. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be used in conjunction with the various embodiments.

Figure 13:
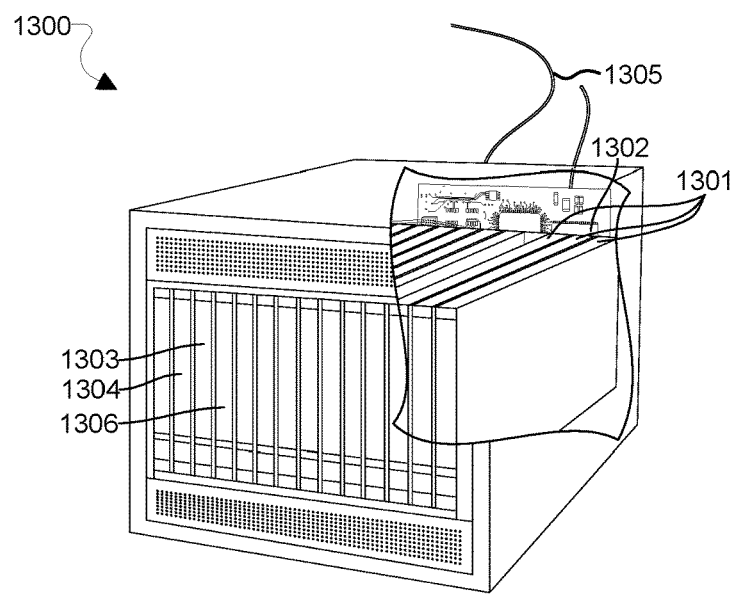
FIG. 13 is component block diagram illustrating an example server suitable for use with the various embodiments.

The various embodiments (including, but not limited to, embodiments described above with reference to FIGS. 1-10) may also be implemented in fixed computing systems, such as any of a variety of commercially available servers. An example server 1300 is illustrated in FIG. 13. Such a server 1300 typically includes one or more multi-core processor assemblies 1301 coupled to volatile memory 1302 and a large capacity nonvolatile memory, such as a disk drive 1304. As illustrated in FIG. 13, multi-core processor assemblies 1301 may be added to the server 1300 by inserting them into the racks of the assembly. The server 1300 may also include a floppy disc drive, compact disc (CD) or digital versatile disc (DVD) disc drive 1306 coupled to the processor 1301. The server 1300 may also include network access ports 1303 coupled to the multi-core processor assemblies 1301 for establishing network interface connections with a network 1305, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular. The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of implementing wake lock aware scheduling on a computing device, comprising:
   receiving a wake lock request by a wake lock profiler;
   acquiring, by the wake lock profiler, wake lock information of a wake lock event associated with the wake lock request, wherein the wake lock information includes a wake lock time parameter;
   sending, by the wake lock profiler, a hint including the wake lock time parameter;
   receiving the hint by a scheduler;
   determining, by the scheduler, whether a first ready job can execute during the wake lock event; and
   sending, by the scheduler, a request for permission to schedule the first ready job for execution during the wake lock event in response to determining that the first ready job can execute during the wake lock event.

2. The method of claim 1, wherein the request for permission to schedule the first ready job for execution during the wake lock event includes an estimate of processor usage for the first ready job, the method further comprising:
   receiving, by the wake lock profiler, the request for permission to schedule the first ready job for execution during the wake lock event;
   determining, by the wake lock profiler, whether a workload including the first ready job exceeds a total processor usage threshold;
   sending, by the wake lock profiler, a rejection of the request for permission to schedule the first ready job for execution during the wake lock event in response to determining that the workload exceeds the total processor usage threshold; and
   sending, by the wake lock profiler, an approval of the request for permission to schedule the first ready job for execution during the wake lock event in response to determining that the workload does not exceed the total processor usage threshold.

3. The method of claim 2, further comprising:
   receiving, by the scheduler, the rejection of the request for permission to schedule the first ready job for execution during the wake lock event;
   determining, by the scheduler, whether a second ready job can execute during the wake lock event;
   sending, by the scheduler, a request for permission to schedule the second ready job for execution during the wake lock event in response to determining that the second ready job can execute during the wake lock event;
   receiving, by the scheduler, the approval of the request for permission to schedule the second ready job for execution during the wake lock event; and
   scheduling the second ready job for execution during the wake lock event.

4. The method of claim 1, further comprising:
   determining, by the scheduler, whether the first ready job exceeds a processor usage threshold, wherein sending the request for permission to schedule the first ready job for execution during the wake lock event in response to determining that the first ready job can execute during the wake lock event and in response to determining that the first ready job does not exceed the processor usage threshold; and
   determining, by the scheduler, whether a second ready job can execute during the wake lock event.

5. The method of claim 1, further comprising:
   determining, by the wake lock profiler, whether the wake lock information includes a wake lock time parameter;
   calculating, by the wake lock profiler, a wake lock duration estimate for the wake lock event in response to determining that the wake lock information does not include the wake lock time parameter; and
   storing, by the wake lock profiler, the wake lock duration estimate.

6. The method of claim 5, wherein:
   storing the wake lock duration estimate comprises:
      correlating the wake lock duration estimate with a wake lock identifier (ID) of the wake lock event associated with the wake lock request; and
      storing the wake lock duration estimate in a wake lock information data structure with a corresponding wake lock ID; and
   acquiring the wake lock information comprises retrieving the wake lock duration estimate from the wake lock information data structure.

7. The method of claim 5, wherein calculating the wake lock duration estimate for the wake lock event comprises calculating the wake lock duration estimate for the wake lock event using a plurality of wake lock durations for the wake lock event.

8. The method of claim 7, wherein the plurality of wake lock durations include one of a plurality of wake lock duration estimates, a plurality of wake lock duration observations, or a plurality of wake lock estimates and wake lock observations.

9. A wake lock aware system configured to implement wake lock aware scheduling on a computing device, comprising:
   a processor configured with executable instructions to implement a wake lock profiler, wherein the wake lock profiler is configured to:
      receive a wake lock request;
      acquire wake lock information of a wake lock event associated with the wake lock request, wherein the wake lock information includes a wake lock time parameter; and send a hint including the wake lock time parameter; and the processor is further configured with executable instructions to implement a scheduler, wherein the scheduler is configured to:
receive the hint;
determine whether a first ready job can execute during the wake lock event; and
send a request for permission to schedule the first ready job for execution during the wake lock event in response to determining that the first ready job can execute during the wake lock event.

10. The wake lock aware system of claim 9, wherein the request for permission to schedule the first ready job for execution during the wake lock event includes an estimate of processor usage for the first ready job, and
wherein the processor configured with executable instructions to implement the wake lock profiler is further configured with executable instructions to:
receive the request for permission to schedule the first ready job for execution during the wake lock event;
determine whether a workload including the first ready job exceeds a total processor usage threshold;
send a rejection of the request for permission to schedule the first ready job for execution during the wake lock event in response to determining that the workload exceeds the total processor usage threshold; and
send an approval of the request for permission to schedule the first ready job for execution during the wake lock event in response to determining that the workload does not exceed the total processor usage threshold.

11. The wake lock aware system of claim 10, wherein the processor configured with executable instructions to implement the scheduler, wherein the scheduler is further configured to:
receive the rejection of the request for permission to schedule the first ready job for execution during the wake lock event;
determine whether a second ready job can execute during the wake lock event;
send a request for permission to schedule the second ready job for execution during the wake lock event in response to determining that the second ready job can execute during the wake lock event;
receive the approval of the request for permission to schedule the second ready job for execution during the wake lock event; and
schedule the second ready job for execution during the wake lock event.

12. The wake lock aware system of claim 9, wherein the processor configured with executable instructions to implement the scheduler, wherein the scheduler is further configured to:
determine whether the first ready job exceeds a processor usage threshold, wherein sending the request for permission to schedule the first ready job for execution during the wake lock event in response to determining that the first ready job can execute during the wake lock event and in response to determining that the first ready job does not exceed the processor usage threshold; and
determine whether a second ready job can execute during the wake lock event.

13. The wake lock aware system of claim 9, wherein the processor configured with executable instructions to implement the wake lock profiler, wherein the wake lock profiler is further configured to:
determine whether the wake lock information includes a wake lock time parameter;
calculate a wake lock duration estimate for the wake lock event in response to determining that the wake lock information does not include a wake lock time parameter; and
store the wake lock duration estimate.

14. The wake lock aware system of claim 13, wherein the processor configured with executable instructions to implement the wake lock profiler such that:
storing the wake lock duration estimate comprises:
correlating the wake lock duration estimate with a wake lock identifier (ID) of the wake lock event associated with the wake lock request; and
storing the wake lock duration estimate in a wake lock information data structure with a corresponding wake lock ID; and
acquiring the wake lock information comprises retrieving the wake lock duration estimate from the wake lock information data structure.

15. The wake lock aware system of claim 13, the processor configured with executable instructions to implement the wake lock profiler such that calculating the wake lock duration estimate for the wake lock event comprises calculating the wake lock duration estimate for the wake lock event using a plurality of wake lock durations for the wake lock event.

16. The wake lock aware system of claim 15, wherein the plurality of wake lock durations include one of a plurality of wake lock duration estimates, a plurality of wake lock duration observations, or a plurality of wake lock estimates and wake lock observations.

17. A wake lock aware system configured to implement wake lock aware scheduling on a computing device, comprising:
means for receiving a wake lock request;
means for acquiring wake lock information of a wake lock event associated with the wake lock request, wherein the wake lock information includes a wake lock time parameter;
means for sending a hint including the wake lock time parameter;
means for receiving the hint;
means for determining whether a first ready job can execute during the wake lock event; and
means for sending a request for permission to schedule the first ready job for execution during the wake lock event in response to determining that the first ready job can execute during the wake lock event.

18. The wake lock aware system of claim 17, wherein the request for permission to schedule the first ready job for execution during the wake lock event includes an estimate of processor usage for the first ready job, the wake lock aware system further comprising:
means for receiving the request for permission to schedule the first ready job for execution during the wake lock event;
means for determining whether a workload including the first ready job exceeds a total processor usage threshold;
means for sending a rejection of the request for permission to schedule the first ready job for execution during the wake lock event in response to determining that the workload exceeds the total processor usage threshold; and
means for sending an approval of the request for permission to schedule the first ready job for execution during the wake lock event in response to determining that the workload does not exceed the total processor usage threshold.

19. The wake lock aware system of claim 18, further comprising:
means for receiving the rejection of the request for permission to schedule the first ready job for execution during the wake lock event;
means for determining whether a second ready job can execute during the wake lock event;
means for sending a request for permission to schedule the second ready job for execution during the wake lock event in response to determining that the second ready job can execute during the wake lock event;
means for receiving the approval of the request for permission to schedule the second ready job for execution during the wake lock event; and
means for scheduling the second ready job for execution during the wake lock event.

20. The wake lock aware system of claim 17, further comprising:
means for determining whether the first ready job exceeds a processor usage threshold, wherein means for sending the request for permission to schedule the first ready job for execution during the wake lock event comprises means for sending the request for permission to schedule the first ready job for execution during the wake lock event in response to determining that the first ready job can execute during the wake lock event and in response to determining that the first ready job does not exceed the processor usage threshold; and
means for determining whether a second ready job can execute during the wake lock event.

21. The wake lock aware system of claim 17, further comprising:
means for determining whether the wake lock information includes a wake lock time parameter;
means for calculating a wake lock duration estimate for the wake lock event in response to determining that the wake lock information does not include a wake lock time parameter; and
means for storing the wake lock duration estimate.

22. The wake lock aware system of claim 21, wherein:
means for storing the wake lock duration estimate comprises:
means for correlating the wake lock duration estimate with a wake lock identifier (ID) of the wake lock event associated with the wake lock request; and
means for storing the wake lock duration estimate in a wake lock information data structure with a corresponding wake lock ID; and
means for acquiring the wake lock information comprises means for retrieving the wake lock duration estimate from the wake lock information data structure.

23. The wake lock aware system of claim 21, wherein means for calculating the wake lock duration estimate for the wake lock event comprises means for calculating the wake lock duration estimate for the wake lock event using a plurality of wake lock durations for the wake lock event, wherein the plurality of wake lock durations include one of a plurality of wake lock duration estimates, a plurality of wake lock duration observations, or a plurality of wake lock estimates and wake lock observations.

24. A non-transitory processor-readable storage medium having stored thereon processor-executable instructions configured to cause a processor of a computing device to perform operations comprising:
receiving a wake lock request;
acquiring wake lock information of a wake lock event associated with the wake lock request, wherein the wake lock information includes a wake lock time parameter;
sending a hint including the wake lock time parameter;
receiving the hint;
determining whether a first ready job can execute during the wake lock event; and
sending a request for permission to schedule the first ready job for execution during the wake lock event in response to determining that the first ready job can execute during the wake lock event.

25. The non-transitory processor-readable storage medium of claim 24, wherein the request for permission to schedule the first ready job for execution during the wake lock event includes an estimate of processor usage for the first ready job, and wherein the stored processor-executable instructions are configured to cause the processor to perform operations further comprising:
receiving the request for permission to schedule the first ready job for execution during the wake lock event;
determining whether a workload including the first ready job exceeds a total processor usage threshold;
sending a rejection of the request for permission to schedule the first ready job for execution during the wake lock event in response to determining that the workload exceeds the total processor usage threshold; and
sending an approval of the request for permission to schedule the first ready job for execution during the wake lock event in response to determining that the workload does not exceed the total processor usage threshold.

26. The non-transitory processor-readable storage medium of claim 25, wherein the stored processor-executable instructions are configured to cause the processor to perform operations further comprising:
receiving the rejection of the request for permission to schedule the first ready job for execution during the wake lock event;
determining whether a second ready job can execute during the wake lock event;
sending a request for permission to schedule the second ready job for execution during the wake lock event in response to determining that the second ready job can execute during the wake lock event;
receiving the approval of the request for permission to schedule the second ready job for execution during the wake lock event; and
scheduling the second ready job for execution during the wake lock event.

27. The non-transitory processor-readable storage medium of claim 24, wherein the stored processor-executable instructions are configured to cause the processor to perform operations further comprising:
determining whether the first ready job exceeds a processor usage threshold, wherein sending the request for permission to schedule the first ready job for execution during the wake lock event comprises sending the request for permission to schedule the first ready job for execution during the wake lock event in response to determining that the first ready job can execute during the wake lock event and in response to determining that the first ready job does not exceed the processor usage threshold; and determining whether a second ready job can execute during the wake lock event.

28. The non-transitory processor-readable storage medium of claim 24, wherein the stored processor-executable instructions are configured to cause the processor to perform operations further comprising:
   determining whether the wake lock information includes a wake lock time parameter;
   calculating a wake lock duration estimate for the wake lock event in response to determining that the wake lock information does not include a wake lock time parameter; and
   storing the wake lock duration estimate.

29. The non-transitory processor-readable storage medium of claim 28, wherein the stored processor-executable instructions are configured to cause the processor to perform operations such that:
   storing the wake lock duration estimate comprises:
      correlating the wake lock duration estimate with a wake lock identifier (ID) of the wake lock event associated with the wake lock request; and
      storing the wake lock duration estimate in a wake lock information data structure with a corresponding wake lock ID; and
   acquiring the wake lock information comprises retrieving the wake lock duration estimate from the wake lock information data structure.

30. The non-transitory processor-readable storage medium of claim 28, wherein the stored processor-executable instructions are configured to cause the processor to perform operations such that calculating the wake lock duration estimate for the wake lock event comprises calculating the wake lock duration estimate for the wake lock event using a plurality of wake lock durations for the wake lock event, wherein the plurality of wake lock durations include one of a plurality of wake lock duration estimates, a plurality of wake lock duration observations, or a plurality of wake lock estimates and wake lock observations.

31. A wake lock aware system configured to implement wake lock aware scheduling on a computing device, comprising:
   a wake lock profiler hardware component configured to:
      receive a wake lock request;
      acquire wake lock information of a wake lock event associated with the wake lock request, wherein the wake lock information includes a wake lock time parameter; and
      send a hint including the wake lock time parameter; and
   a scheduler hardware component communicatively connected to the wake lock profiler hardware component and configured to:
      receive the hint;
      determine whether a first ready job can execute during the wake lock event; and
      send a request for permission to schedule the first ready job for execution during the wake lock event in response to determining that the first ready job can execute during the wake lock event.

\* \* \* \* \*